United States Patent [19]

Dixon et al.

[11] 3,937,185

[45] Feb. 10, 1976

[54] STAGGERED CONFIGURATION FOR WANKEL ENGINE SPARK PLUGS

[75] Inventors: James R. Dixon, Plymouth; Charles M. Jones, Detroit, both of Mich.

[73] Assignee: Ford Motor Company, Dearborn, Mich.

[22] Filed: Sept. 5, 1974

[21] Appl. No.: 503,534

[52] U.S. Cl. ............................ 123/8.01; 123/8.09
[51] Int. Cl.² ..................... F02B 55/10; F02B 53/12
[58] Field of Search ............ 418/83; 123/8.01, 8.09

[56] References Cited

UNITED STATES PATENTS

| | | | |
|---|---|---|---|
| 3,246,636 | 4/1966 | Bentele | 123/8.09 |
| 3,393,667 | 7/1968 | Jones | 123/8.09 |
| 3,703,163 | 11/1972 | Lamm | 123/8.09 |
| 3,793,996 | 2/1974 | Scheerer | 123/8.09 |
| 3,836,293 | 9/1974 | Lamm | 123/8.01 X |

Primary Examiner—C. J. Husar
Assistant Examiner—Leonard Smith
Attorney, Agent, or Firm—Joseph W. Malleck; Keith L. Zerschling

[57] ABSTRACT

A rotary internal combustion engine is disclosed having circumferential type cooling circuit for the rotor housing and a plurality of spark plugs extending through the trochoid wall of the rotor housing at a vertically rising zone of said circuit. The plugs are contained by bosses extending through the coolant flow passage; the bosses are arranged to stagger the up-stream sides of said bosses with respect to controlled flow of coolant thereabout, thereby increasing flow control, increasing heat transfer, and preventing a collection of vapor which may act as an insulation film hindering heat transfer between said bosses and coolant flow. The centerline of said bosses are preferably skewed with respect to both a plane bisecting the flow longitudinally and a plane bisecting the flow transversely, whereby the spark terminals of said plugs may be maintained within narrow offset limits on opposite sides of a centerline of the gas side of said trochoid wall.

11 Claims, 6 Drawing Figures

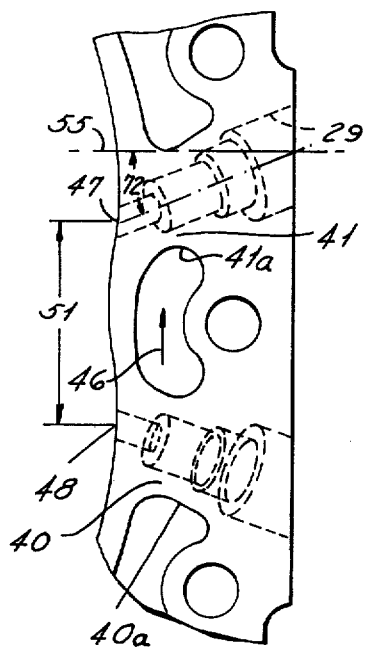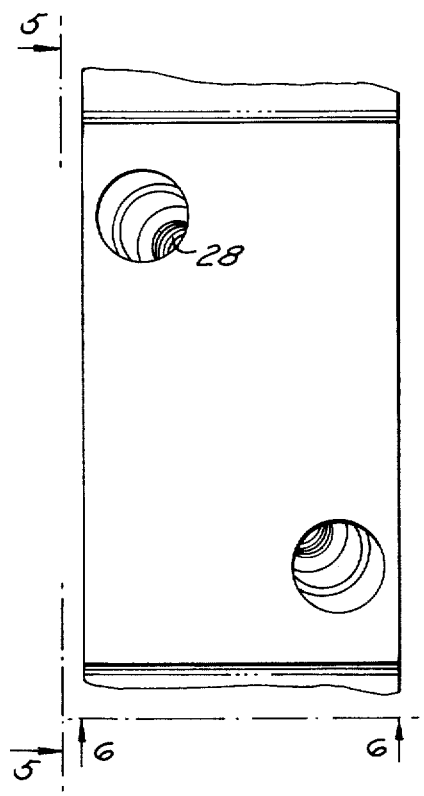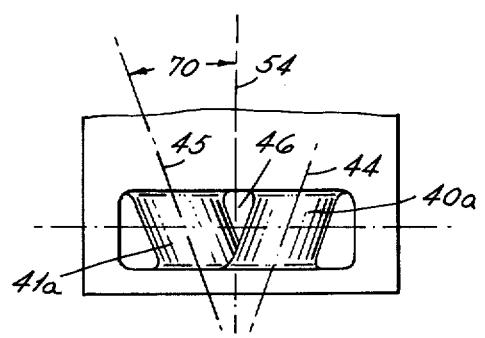

STAGGERED CONFIGURATION FOR WANKEL ENGINE SPARK PLUGS

BACKGROUND OF THE INVENTION

Although rotary internal combustion engines have reached a degree of commercial acceptance, considerable interest is now being devoted to improving fuel economy and durability of such engines. The water cooling system for such an engine is particularly relevant to attaining these two goals. The housing water cooling system, in a rotary engine, functions to lower the temperature of the metal areas exposed to the highest heat input and to minimize temperature differences throughout the housing for preventing destruction. The most severe cooling problem resides in the area where combustion and expansion of the working gases takes place; this area immediately surrounds the spark plugs. The uneven heating can cause housing distortion which, in turn, can prevent proper functioning of the gas and oil sealing elements. The time during which the combustion chamber is cooled by fresh inducted air is fairly short allowing the wall temperature of the combustion chamber to be high and sensitive to changes in load. The maximum temperature of the combustion surface of the trochoid wall is much higher than that of the housing side walls; local overheating can destroy the oil film on the trochoid surface. Sudden acceleration with a cold engine, especially in winter or when auto ignition occurs during high speed driving, exposes the rotor housing and associated trochoid wall to repeated sudden and very large thermal loads. As a result, thermal fatigue or thermal shock cracks can appear about the spark plug holes. In general, cracks occur most frequently on the gas side of the trochoid wall and along the spark plug holes in the axial direction in conformity with high stress concentrations. In extreme cases, cracks can even reach the water jacket. There is a greater need for perfection in design to limit this tendency for thermal distortion which is so highly dependent on the relationship between the cooling system, housing and rotor seals.

One particular design aspect that has assumed commercial acceptance, is the use of in-line or dual spark plugs for a single rotor housing. The reason for the dual in-line spark plugs is as follows: In a rotary piston engine with a rotor rotating eccentrically along an inside surface having a trochoid curve, it is ideal for the spark plugs to be installed on the trochoid surface close to the minor axis of the curve, from the standpoint of engine output. However, since the compressed air-fuel mixture also undergoes a rotating motion along with the rotation of the rotor, the rotary engine has a characteristic flame front which advances to the leading side of the rotor and has very little propagation to the trailing side of the rotor. Therefore, the air-fuel mixture disposed in the trailing portion of the rotor combustion pocket is not completely burned. Consequently, the exhaust gas will contain a large amount of unburned gaseous components. To remedy this, another or auxiliary spark plug is installed downstream from the first spark plug and the latter is moved slightly upstream; the auxiliary spark plug is ignited after the first spark plug has been ignited, or in certain cases they may be ignited simultaneously. The necessity for the in-line arrangement is due to the physics of propagation and the desire to have the entire air-fuel mixture totally combusted. The optimum location to do this was thought to be in the center of the peripheral wall whereby the flame front would advance in the direction of movement of the air/fuel mass and proceed laterally across the shortest path toward each of the side walls to combust all of the mixture. Unfortunately, the in-line arrangement of such spark plugs creates a mechanism by which the flow of cooling fluid is considerably disrupted, vapor films collect, and the flow is prevented from carrying away the heat in such a critical area.

Spark plugs for an internal combustion engine, such as a rotary, are typically installed into the threaded ports of the spark plug bosses. Since a rotary engine has a relatively thin trochoid wall, cylindrically shaped bosses for the spark plugs must be cast and extend into the engines water jacket passageway which is adjacent to such wall. The interruption or interference of such bosses within the water jacket passageway has a benefit in that the bosses themselves are cooled to carry away heat but the total heat for the entire hot spot area is detrimentally affected; the cooling flow is extremely sensitive to hindrances preventing heat extraction. Each boss in a four-cylinder reciprocating engine will be affected by generally ¼ of the total heat of combustion for the engine. This is not a severe problem in connection with reciprocating type internal combustion engines since the spark plug bosses are well separated in the cylinder heatt water jacket and, in fact, can be considered as one spark plug per cylinder. However, in contradistinction, the spark plug bosses in a rotary engine are cast in close proximity to the circumference of each rotor housing, do not have special coolant transfer ports for improved cooling, and are generally affected by ½ of the total heat of combustion for a two rotor engine (for a one rotor engine, the bosses would be effective by the total undivided heat of combustion).

As the rotary design has developed, spark plugs have been fitted into the threaded ports which open onto the most critically cooled zone of the trochoid combustion surface - a major hot spot where thermally induced structural failures are more likely to occur. If the cooling flow cannot carry away the heat in a uniform manner, the exact amount of excess heat in such hot spot will cause detrimental results. The in-line arrangement of spark plug bosses in such water passageway contributes, in a significant manner, to preventing adequate heat extraction. Particularly in the vertically upward flow of the cooling circuit, where in-line spark plugs are typically placed, the up-stream plug boss creates a flow shadow effect upon the down-stream plug boss preventing a controlled or well ordered flow regime (absence of swirling eddies which deteriorate heat transfer). Boiling at the plugs results in a vapor stream which widens the uncontrolled flow zone and aggravates the heat transfer problem.

SUMMARY OF THE INVENTION

A primary object of this invention is to provide an ignition and cooling system combination which is effective to maintain an efficient level of combustion while improving cooling characteristics to reduce the possibility of structural failure of the engine's housing.

Another object of this invention is to provide a housing structure which facilitates circumferential cooling flow in the rotor housing while permitting the intrusion of spark plug bosses therethrough, the housing being structured to minimize thermal distortion, particularly in the zone surrounding said spark plug bosses.

Still another object of this invention is to provide a housing for a rotary internal combustion engine having a peripheral cooling circuit defined so that there are separate flow paths for release of boiling vapor from a plurality of spark plug bosses interrupting such circuit.

Yet still another object of this invention is to provide a housing structure for a rotary internal combustion engine which employs circumferential cooling having a vertical flow moving past bosses therein which are an integral part of said structure, the structure being made to increase the heat transfer coefficient of said cooling circuit at the spark plug boss zone by at least 20% over prior art capabilities.

Structural features pursuant to the above objects comprise the use of (a) plug bosses interposed in a circumferential cooling flow passageway of the rotor housing, and staggered with respect to the direction of flow, the arrangement of the plurality of spark plugs and accompanying bosses are offset but symmetrically oppositely oriented about a centerplane of said flow and skewed with respect thereto so that the staggered arrangement promotes relatively close in-line arrangement of the spark plug terminals, (b) the incorporation of a predetermined and limited offset from a line extending between the spark plug terminals so as not to detrimentally affect propagation of the combustion flame while yet allowing for said staggered boss configuration, and (c) the use of flow diverters or flow controllers between the spark plug bosses to insure a controlled flow regime between the bosses and for strengthening the housing structure.

SUMMARY OF THE DRAWINGS

FIG. 4 is a view taken substantially along line 4—4 of FIG. 3;

FIG. 5 is a side elevational view of the fragmentary structure of FIG. 4; and

FIG. 6 is an end elevational view taken along line 6—6 of the fragmentary structure of FIG. 4.

DETAILED DESCRIPTION

Spark plugs for any type of internal combustion engine are typically installed into threaded openings within spark plug bosses. The cylindrically shaped bosses are cast into the engine water jacket passageway to prevent cracking of the support structure due to thermal distortion. Coolant flow velocities are directed over these critically cooled surfaces of the bosses to lower the metal temperatures and, ideally, to prevent excessive temperature variation across the walls defining said passageway (i.e., hot spots which induce thermal distortion and attendant failure of the housing structure).

Figure 3:
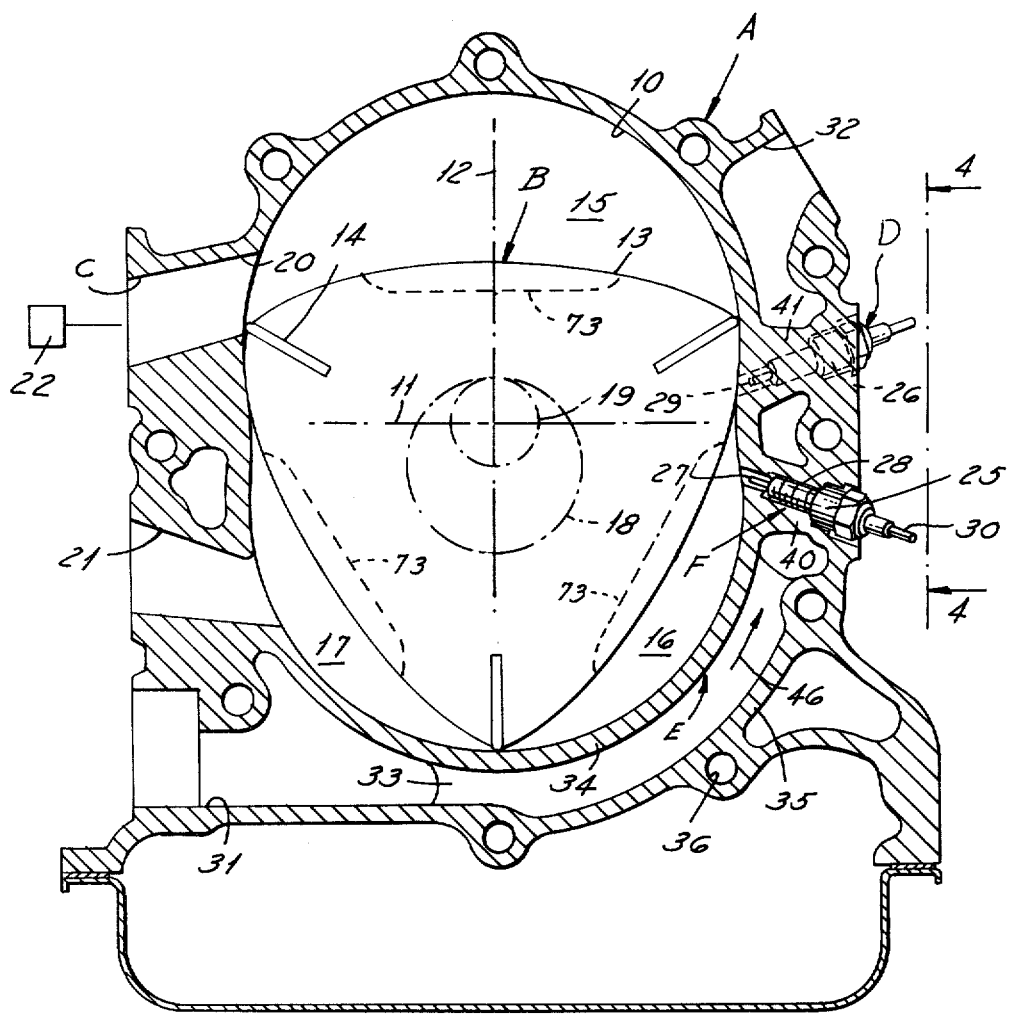
FIG. 3 is a sectional elevational view of one rotor housing and rotor for a multi-rotor rotary internal combustion engine embodying the principles of this invention.
Figure 1:
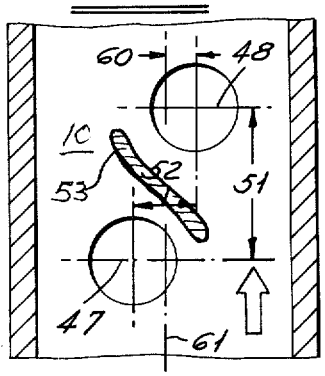
FIGS. 1 and 2 represent schematic illustrations of spark plug boss arrangements for the inventive mode and the prior art mode respectively.
Figure 2:
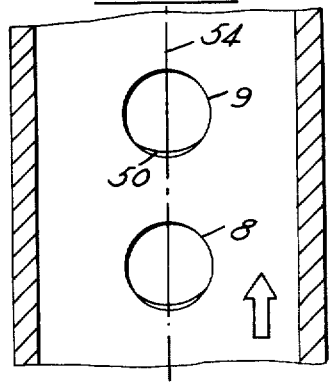

Turning to FIG. 2, there is schematically illustrated in plan view, an arrangement characterized as "in-line" for bosses 8 and 9 with respect to a centerplane 54 extending through a water jacket passage of a typical prior art rotor housing. Cooling flow is aggravated during boiling heat transfer at high engine power settings; vapor released from the upstream boss surfaces induce further variations in the coolant velocity distribution across the downstream boss laying in the flow shadow of the upstream boss for the in-line arrangement. In FIG. 1 there is, schematically shown, bosses which are staggered with respect to the centerplane 54 of flow of the coolant in the water jacket passage for a rotary engine employing the principles of this invention. The construction of FIG. 2 provides superior coolant performance about the circumference of each spark plug boss when compared to closely spaced "in-line" bosses, the latter preventing high speed coolant flow between the bosses. The distribution of coolant velocities around the staggered spark plug boss surface is improved since flow around each boss is less dependent on the presence of the other boss in the water jacket passageway. The vapor released from the upstream boss is carried away from the coolant stream impinging on the downstream boss. This reduces locally high thermal conditions by improving the distribution of coolant velocities around the boss surface and hence the engine water jacket by providing separate paths for vapor release during boiling heat transfer.

In some particularity, a preferred embodiment is shown in FIGS. 3–6. The rotary engine of FIG. 3, comprises a housing A, a rotor B, an induction system or means C, an ignition system D, means E which is effective to define a cooling passageway, and boss means F useful in containing the ignition means within the water passageway.

The housing A has an internal wall 10 which is epitrochoidally shaped to delimit a chamber in cooperation with side housings disposed on opposite sides of housing A (rotor housing). The epitrochoid chamber has a minor axis 11 and a major axis 12. The rotor C is generally triangularly shaped with three outer arcuate faces 13; apex seals 14 are disposed at the apices where the faces 13 intersect. The seals cooperate in defining with the rotor and housing a plurality of variable volume combustion chambers 15, 16 and 17. The rotor is mounted for planetary movement within the trochoidally limited chamber bounded by an internal epitrochoid wall 10 and has an eccentric surface 18 which is in contact with an eccentric shaft 19.

A combustible mixture is inducted through system C; the system has a carburetor 22 effective to inject said mixture through intake passage 20 leading to the trochoid chamber. An exhaust passage 21 withdraws the exhaust gases upon completion of the combustion cycle. The ignition means D utilizes a plurality of spark plugs, here shown two in number, 25 and 26, which are arranged at stations on opposite sides of the minor axis 11. The spark plugs may be of the conventional flat-gap type and each has a threaded portion 28 received in a threaded portion of a bore in said boss means F. The spark plugs have terminal portions 27 and 29 respectively with appropriate lead-in electrical wires 30 for carrying a pulse of energy to excite sparks in a precise sequence. The terminals 27 and 29 are almost coincident with the trochoid surface 10 and therefore can be represented in our discussion by substantially a point station.

Means E, defining the cooling passage, extends from an entrance at 31 into the housing (at about a 7 o'clock position) to an exiting station 32 (at a 1 o'clock position). The housing means E comprises a wall 34 separating the trochoid chamber 10 from the cooling passage E and has a predetermined thickness which is relatively thin. The passage may have one or more rather elongated ribs 33 for guiding or structurally reinforcing the housing passage. The flow proceeds along a path which has a centerline 46 and has a substantial segment thereof which is rising vertically along the side of the rotor housing A.

The boss means F comprises two cylindrically shaped and cast bosses 41 and 40 which extend across the passageway at a location adjacent the vertically rising section of said flow. The centerline, 44 and 45 respectively, of each boss is skewed with respect to a centerplane 54 dividing the passageway longitudinally. The bosses have an arrangement such that the terminal of each spark plug will project onto a point on the trochoid wall 10 preferably offset a distance 60 (from the centerline 61 of said trochoid wall (see FIG. 1). The combined offset distances are less than the diameter of either of said bosses. The bosses are arranged so that, looking at them along the passageway, they show frontal or upstream portions 40a and 41a which are substantially non-overlapping whereby fluid flow of a high velocity may scavenge such surfaces and prevent the collection of vapor generated at such hot surfaces. Vapor generation tends to collect and develop a vapor binding film 50 along the upstream side of each boss in an "in-line" situation (see FIG. 2). Ideally, the positioning of the terminals 27 and 29 of each spark plug for this invention approach an in-line arrangement on the trochoid surface 10 (gas side of wall 34), while the bosses are arranged to effect a very definite and noticeable offset arrangement in the passage E. The bosses are packaged in the housing in such a manner that the boss centerlines 44 and 45 will each form an angle 70 with respect to the plane 54 dividing the coolant passage longitudinally and an angle 72 with respect to a plane 55 dividing the coolant passage transversely. The range for such angles is as follows: Angle 70 is preferably about 25°–65° and angle 72 is preferably about 15°–55°, but operably can be reduced to 0° for each angle. The cylindrical trunk of each boss has the terminals 27 and 29 spaced apart a longitudinal distance 51 which is typically less than 12 diameters of each boss; the distance 51 is somewhat limited by the pocket 73 design for the rotor. However, irrespective of the pocket design, if the boss diameter is relatively small so that side wall effects on the flow about the bosses can be ignored, then this invention is important for spacings between bosses up to 50 boss diameters. In applications where the boss diameter is relatively large with respect to the width of the cooling passage, side wall effects will be present and the invention will be important for longitudinal spacings between bosses of up to 12 diameters.

As a result of the staggered configuration of the spark plug bosses, high velocity flow therethrough is controlled and devoid of uncontrolled swirling eddies so that a high heat transfer coefficient can be maintained at the sensitive spark plug boss surfaces. Geometrically, the flow is split into several paths as it swings to different sides of the upstream spark plug boss 40 and thence at portion divides about the downstream boss 41. Accordingly, vapor released from either one of the boiling surfaces of the spark plug bosses enters the swinging controlled split paths.

Tests were undertaken to visually compare the flow regime of a water model passageway simulating the passage plug bosses. Two models are undertaken, one with staggered spark plug bosses and one with "in-line" spark plug bosses. Small neutral density plastic particles, entrained in the water flow stream, were used to trace the contours of the coolant flow path. In addition, electrolysis of the water was employed to produce hydrogen gas (bubbles smaller than the vapor bubbles typically encountered in the rotary engine). The hydrogen gas was found to collect in rather large crescent shaped zones 50 on the upstream side or frontal face 40a and and 41a of the in-line bosses, such as shown in FIG. 2. However, with the staggered spark plug configuration, high speed controlled flow sweeps these vapor particles clean from such upstream sides or frontal faces and it has been determined that the heat transfer coefficient between the flow and bosses is increased by as much as 44% for the model study. To relate this to an actual engine housing, the change in heat transfer rate was calculated utilizing a maximum flow velocity of about 4.1 feet per second and volume flow rate of about .033 cubic feet per second. The temperature of the coolant flow at the wall was measured to be approximately 320°F and at the coolant flow centerline at about 225°F, thereby rendering an average coolant flow temperature of about 270°F; the minimum projected area of the passageway about the zone adjacent the spark plug bosses was 1.17 square inches. Calculation of the Reynolds number for the flow determined it to be about $1.2 \times 10^5$ (a non-dimensional number) which indicated that the flow was in a controlled turbulent condition. The heat transfer coefficient, calculated for the "in-line" arrangement, was about 1800 Btu/Hr/Ft$^2$/°F. This was in sharp contrast with the heat transfer coefficient calculated for the staggered arrangement which was about 2600 Btu/Hr/Ft$^2$/°F. [The diameter of the spark plug boss as assumed to be about .85 inches with the height of each boss being approximately .80 inches]. The temperature gradiant across the width of the gas side (surface 10) of the wall 34, rather than being a variable distribution with the highest temperature at the centerline 61 of surface 10, as for an in-line arrangement, is now found to be more uniform and flat but less symmetrical. The amount of offset 60 of a spark plug terminal (viewed as the intersection of axes 47 and 48 for each boss in FIG. 1) is important. The offset 60 is a dimension that should be viewed with reference to the centerline 61 of the surface 10; it must preferably be less than a radius of a boss to achieve the benefits of this invention.

We claim as our invention:

1. In a rotary internal combustion engine having housing walls defining a trochoidally shaped chamber, an eccentrically mounted rotor for planetary movement in said chamber and cooperating with said housing walls to define a plurality of variable volume chambers into which is introduced a combustible mixture, said engine having spark plugs interposed in said housings walls and having spark terminals for igniting said mixture at a predetermined sequence, the combination comprising:

a. housing means defining a cooling passage along at least one of said housing walls and containing a flowing coolant, that portion of said one housing wall separating said variable volume chambers from said passage having a predetermined section thickness to promote an improved heat transfer rate, said one wall having a gas side and a coolant side, said cooling passage and coolant therein being effective to extract heat from said one wall portion to prevent detrimental housing distortion, and b. a plurality of bosses extending into said passage for containing said spark plugs and each boss having an axis transverse to the direction of coolant flow, each boss having an upstream side and a downstream side taken with respect to the direction of said coolant flow, the axes of said bosses being non-aligned with respect to a centerline of coolant flow through said passage and non-aligned with respect to any transverse section of said flow adjacent said bosses, said bosses positioning said terminals in a staggered pattern or approaching an aligned pattern with respect to a centerline of the gas side of said one wall.

2. The combination as in claim 1, in which said bosses have axis angled with respect to a centerplane longitudinally bisecting the passage and the bosses are arranged to position said terminals offset from a centerline of the gas side of said one wall.

3. The combination as in claim 1, in which the coolant flow is a liquid and the bosses are offset with respect to said centerline of flow so that laminar or controlled flow of said coolant is controlled to scavenge substantially the entire upstream side of each boss and improve conditions for removal of vapor collection on the downstream side of each of said bosses.

4. The combination as in claim 1, in which the spacing between the centerlines of said bosses taken in a direction along the centerline of said fluid is at least one boss diameter and no greater than 60 boss diameters.

5. The combination as in claim 1, in which a contoured flow foil is interposed between the spacing between said bosses for insuring controlled turbulent flow about the bosses.

6. The combination as in claim 1, in which the bosses are contoured with a cylindrical taper and staggered with respect to the centerline of said flow in the manner to increase the heat transfer coefficient.

7. The combination as in claim 1, in which at least two spark plug bosses are arranged in close proximity to each other for igniting the combustible mixture within the same variable volume chamber of said engine, the upstream side of said bosses being staggered with respect to each other on opposite sides of said centerline of coolant flow whereby the tendency for collection of boiling vapor at the surface of either of said bosses is substantially reduced thereby increasing the overall heat transfer coefficient between said bosses and the coolant.

8. The combination as in claim 7, in which each boss has an axial centerline, said boss centerlines being skewed with respect to each other, at least one of said bosses making an acute angle both with respect to a plane dividing said fluid flow longitudinally and a plane dividing said flow transversely.

9. The combination as in claim 8, in which said angle taken with respect to said longitudinal plane is preferably in the range of 25°–65°, and the angle taken with respect to said transverse plane is preferably in the range of 15°–55°.

10. The combination as in claim 1, in which said bosses are cylindrical, each having frontal faces substantially exposed to said coolant flow while said terminals are offset from the centerline of said trochoid surface a distance less than a radius of said boss and separated from each other along said flow centerline a distance at least one boss diameter.

11. The combination as in claim 10, in which the combined offset of each boss from the flow centerline is no greater than the diameter of a boss.

* * * * *